June 25, 1968
M. C. SZE
3,390,200
PRODUCTION OF AROMATIC HYROCARBONS BY
HYDRODEALKYLATION AND HYDROGENOLYSIS
Filed Sept. 24, 1965
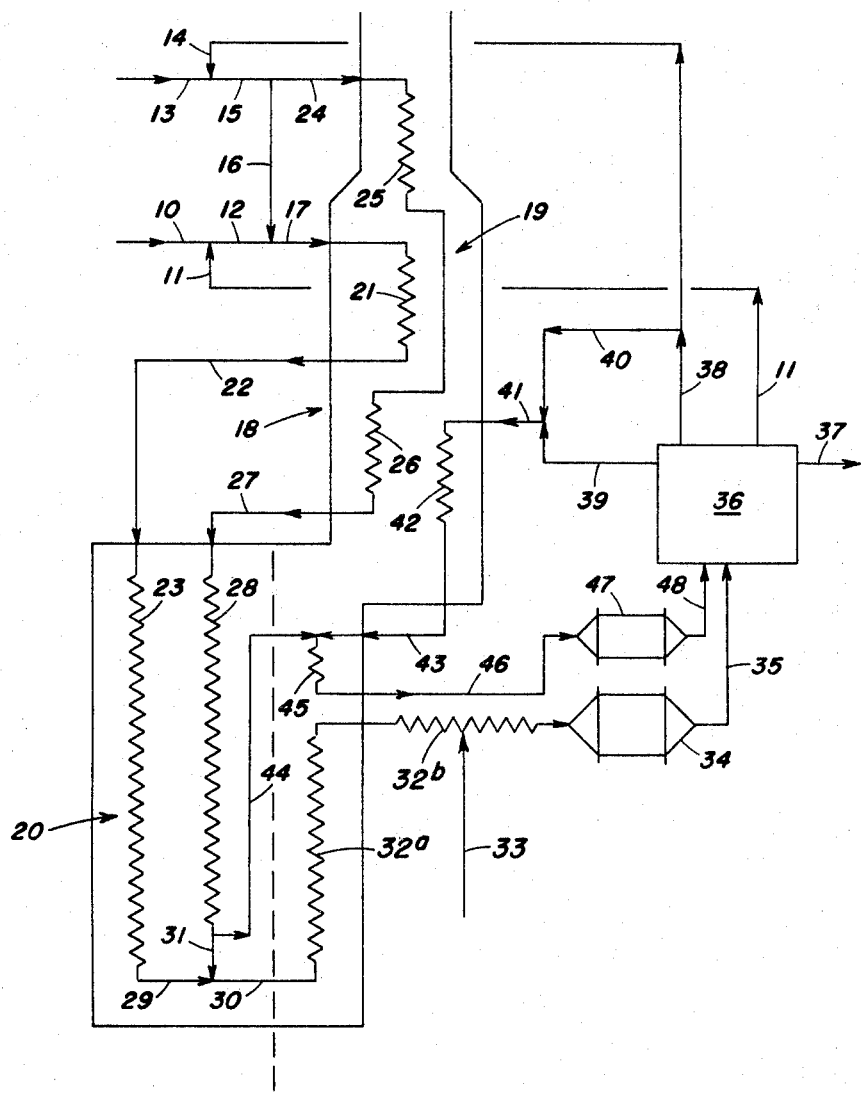
INVENTOR
Morgan C. Sze
BY *Flynn, Marn*
*& Jangarathis*
ATTORNEYS 3,390,200
PRODUCTION OF AROMATIC HYDROCARBONS BY HYDRODEALKYLATION AND HYDROGENOLYSIS
Morgan C. Sze, Garden City, N.Y., assignor to The Lummus Company, New York, N.Y., a corporation of Delaware
Filed Sept. 24, 1965, Ser. No. 489,829
21 Claims. (Cl. 260—672)

ABSTRACT OF THE DISCLOSURE

A process for effecting the hydrogenolysis of a stream primarily comprised of $C_{12}$–$C_{14}$ diphenyl hydrocarbons wherein the stream is mixed with a hydrogen-containing gaseous stream, the streams being mixed in a quantity and at a temperature and rate such that the combined stream is substantially instantaneously brought to a temperature of not less than 1000° F. The mixture is heated to a final reaction temperature of between 1300° and 1700° F. to effect hydrogenolysis in a residence time of 1–10 seconds. The hydrogenolysis is preferably effected in a fired coil reactor and the diphenyl feed stream is preferably obtained as a byproduct from an alkyl aromatic hydrocarbon dealkylation process.

---

This invention relates to a process for the dealkylation of alkyl aromatic hydrocarbons and, more particularly, to the thermal hydrodealkylation of alkyl aromatic hydrocarbons and the hydrogenolysis of diphenyl hydrocarbon to produce valuable products.

The rising demand for aromatic hydrocarbons, such as benzene, naphthalene and selected aromatics has resulted in an increasing demand for toluene, mixed alkylbenzene and mixed alkyl naphthalene feeds, respectively, which may be dealkylated to the more valuable products. There are many catalytic and thermal processes presently available for producing benzene, naphthalene and selected aromatic hydrocarbons from such feedstocks.

The recent trend in industry has been to non-catalytic operation, since there is no catalyst to purchase, charge or regenerate, and less down time as a result of catalyst handling. When compared with catalytic processes, thermal processes provide clean cut reactions and good selectivity, coupled with simplicity of operation. Additionally, thermal processes permit wide feed stock variability.

Generally, operating conditions for thermal hydrodealkylation processes are as follows: temperatures of from 1100° to 1400° F.; hydrogen partial pressures of from 500 to 1000 p.s.i.g.; liquid hourly space velocities of 0.4 to 0.9; and hydrogen dilutions of from 15:1 to 2:1 molar. The reactors are specially designed for the elevated temperatures and the high hydrogen pressures to permit residence times of from 30 to 100 seconds and to provide means to abstract process heat during the hydrodealkylation reaction since the reaction is exothermic.

The thermal dealkylation of an alkyl aromatic hydrocarbon, such as toluene, in the presence of hydrogen primarily results in the formation of benzene and methane, and is sometimes also referred to as a "demethylation" reaction. The presence of hydrogen reduces the number of pyrolysis products formed, since hydrogen will react with the stable aromatic radicals formed during thermal decomposition. Hydrogen is a unique reactant in that it also serves as a product stabilizer, a coke inhibitor and coke remover.

The dealkylation of toluene is accompanied by competing reactions which result in the formation of products other than benzene. One reaction, inter alia, is the destructive hydrogenation of toluene to form methane which reduces the yield of benzene and wastefully consumes hydrogen. Toluene may thus react destructively with ten mols of hydrogen to yield seven mols of methane, whereas other less severe ring destructive reactions produce $C_2$ to $C_6$ hydrocarbons. Further, the condensation of aromatic radicals formed intermediately in toluene and alkyl benzene hydrodealkylation may occur resulting in high boiling polycyclic aromatics. For example, diphenyl, methyl diphenyl, dimethyl diphenyl and fluorene are produced by the thermal condensation of benzene and alkylbenzenes. With more complex alkyl aromatic hydrocarbons, a greater number of competing reactions may take place which may result in lower yields and selectivity of the desired reaction.

The disadvantage of the present catalytic or thermal hydrodealkylation processes, which operate with long residence times as mentioned previously, is their low selectivity. In addition to the formation of diphenyl compounds and fluorene, a significant percentage of the toluene reacted is destroyed and converted to light hydrocarbon gases. Such aromatic ring destructive reactions also result in increased hydrogen consumption. As conversion per pass increases, selectivity decreases further.

Since diphenyl compounds reduced yields and selectivity and are generally regarded as wasteful by-products because of their limited marketability, it has been proposed to recycle and combine such compounds with the fresh feed. However, hydrogenolysis of the diphenyl compounds in this manner does not permit the hydrogenolysis reaction to be effected at its own optimum conditions. Consequently, undesired side reactions take place which detract from the yield of the desired product. Thus, cyclohexylbenzene may be formed by the hydrogenation of one of the rings of the diphenyl molecule, whereas bicyclohexane may be formed by the complete hydrogenation of the diphenyl molecule.

A primary object of my invention is to provide an improved process for the hydrodealkylation of alkyl aromatic hydrocarbons whereby higher conversion and greater selectivity of the desired reaction are achieved.

Another object of my invention is to provide an improved process for the thermal hydrodealkylation of alkyl aromatic hydrocarbons whereby coke formation is minimized.

Still another object of my invention is to provide an improved process for the thermal hydrodealkylation of alkyl aromatic hydrocarbons whereby higher yields are obtained in a reactor of reduced size.

A still further object of my invention is to provide an improved process for the thermal hydrodealkylation of alkyl aromatic hydrocarbons whereby diphenyl compounds formed during thermal hydrodealkylation of the alkyl aromatic hydrocarbons are hydrogenolytically converted to valuable aromatic compounds thereby improving the overall conversion of the alkyl aromatic hydrocarbon feed.

Further objects of my invention will be had by referring to the following description when taken in conjunction with the accompanying drawing.

In accordance with my invention, the alkyl aromatic hydrocarbon feed to be treated is admixed with a hydrogen-containing gaseous stream and heated to a temperature about at which the dealkylation or demethylation is autogenous, generally of from 1000° to 1100° F. Such temperature should be within about 100° F. of the autogenous temperature of the feed. A second hydrogen-containing gaseous stream preheated to a temperature of from 1300° to 1700° F. is admixed with the aforementioned preheated combined feed stream which raises the temperature of the resulting mixture substantially instantaneously to a temperature intermediate the incipient or autogenous temperature and the final reaction temperature of hydrodealkylation. The upper limit to which the second hydrogen-containing gaseous stream is pre-heated, is fixed by metallurgical considerations.

The mixture is thereafter passed through a long reactor coil. The adiabatic reaction alone raises the reacting stream to a high temperature. Depending upon the composition of the alkyl aromatic feedstock, external heating may be applied to the reactor coil to raise the reacting stream to the final temperature or cold hydrogen-containing gas may be injected at an intermediate point or points in the coil to control the temperature rise to below 1700° F.

The effluent is separated into various components. Unconverted alkyl aromatic hydrocarbons are recycled and combined with the fresh feed. A hydrogen-containing gaseous stream is also recycled to the process. The diphenyl compounds separated from the effluent are mixed with a hydrogen-containing gas and preheated to a temperature of about 800 to 1000° F. or over. A second hydrogen-containing gaseous stream preheated to a temperature of about 1500° F. or higher is admixed with the preheated combined feed stream containing the diphenyl compounds whereby the temperature of the combined stream is raised substantially instantaneously to a temperature not less than 1000° F. Since the heat effects of the hydrogenolysis of diphenyl is small, the mixed stream is then passed through an externally heated reaction coil to raise the temperature of the stream to the final reaction temperature, generally of from 1300 to 1700° F. Thus, the alkyl aromatic hydrocarbons and the diphenyl compounds formed during the hydrodealkylation of the alkyl aromatic hydrocarbons are subject to similar but separate processing steps, thereby improving the overall conversions of the feed to valuable products.

The mol ratio of the first hydrogen-containing gaseous stream to the hydrocarbon feed, or the stream containing the diphenyl compounds is 1:1 to 2:1, preferably 1:1. While the mol ratio of the second hydrogen-containing gaseous stream to the preheated combined stream containing the alkyl aromatic hydrocarbons is 3:1 to 8:1, preferably 3:1; the mol ratio of the second hydrogen-containing gaseous stream to the preheated combined stream containing the diphenyl compounds is 5:1 to 15:1, preferably 10:1. The ratio of the second hydrogen-containing stream to the combined stream containing the alkyl aromatic hydrocarbons must be sufficient to raise the resulting mixture to a temperature intermediate the incipient or autogenous temperature and final reaction temperature whereas the ratio of the second hydrogen-containing gaseous stream to the combined stream containing the diphenyl compounds must be sufficient to raise the resulting mixture to a temperature not less than 1000° F. The rise in temperature should be about 150° F. to 300° F. higher than the temperature of the preheated feed stream. The volume percent of hydrogen in each of the streams may differ; however, from a practical standpoint, the source of both streams will be identical. The first hydrogen-containing stream should have at least 50 volume percent hydrogen, while the second hydrogen containing stream should also have at least 50 volume percent hydrogen. The residence time for hydrodealkylation as well as for hydrogenolysis should be very short, from 1 to 10 seconds in order to minimize undesirable by-products. The preferred residence time for hydrodealkylation is dependent on the alkyl aromatic hydrocarbon feed to the process and the desired final reaction temperature, generally of from 1300° to 1700° F. The preferred hydrogenolysis residence time is from 1 to 5 seconds.

As hereinbefore mentioned, the reaction mechanism for the thermal hydrodealkylation of toluene, xylenes and mixed alkyl naphthalenes is a demethylation reaction where the thermally decomposing molecule in the presence of hydrogen forms radicals which are sufficiently stable to react with the hydrogen. In the case of toluene admixed with one mole of hydrogen containing gas as the feed to the process, the temperature for example, is raised to about 1200° F. by admixing the toluene stream with three mols of the second hydrogen-containing gaseous stream. A final reaction temperature of 1550° F. is reached by the adiabatic rise in temperature and supplementary external heating. At this final temperature, there is obtained a 90 percent conversion of toluene at a residence time of about two to three seconds. Of the moles of toluene converted, 90% is converted to benzene and about 9.5% converted to diphenyl compounds. By recycling the unreacted toluene and by the separate hydrogenolysis of the diphenyl compounds, ultimate yields of close to 100 percent can be achieved.

Variations in the molar ratio of hydrogen and its diluent methane gas to alkyl aromatic hydrocarbon feed in the first stream and the ratio of hydrogen and gas quantity in the second stream to that of the first stream will result in variations in the combined stream blend temperature and in its temperature after the attendant adiabatic rise. The adiabatic rise also depends on the composition of the feedstock. At the same conversion, the adiabatic temperature rise is higher with a mixed toluene-xylene feed or a mixed xylene feed than with a pure toluene feed. Any feedstock which contains some paraffinic type of hydrocarbons also liberates more heat of reaction when the paraffinic hydrocarbons are hydrogenated to methane. In the case of pure toluene feed, external heating is needed to obtain the final reaction temperature and achieve the expected conversion at the desired short residence time. With a given reactor coil, the selection of the molar ratio of the second hydrogen-containing gas to the first hydrogen-containing feed stream is a means of adjusting the residence time.

In the thermal hydrodealkylation of mono-substituted alkyl aromatic hydrocarbons, scission normally occurs at the aliphatic-aromatic C—C bond, with benzene being the sole product. With polysubstituted aromatic compounds, scission also occurs at the aliphatic-aromatic C—C bond; however, the reaction takes place stepwise with one alkyl group being removed at a time.

When the alkyl aromatic feed is a $C_8$ aromatic isomer, such as o-, m- and p-xylenes, the operating conditions are essentially the same with the reaction mechanisms being $C_8$ hydrocarbons to toluene, and toluene to benzene. Ethylbenzene present in the feed will be converted directly to benzene. Such mechanisms are of the first order reaction with respect to the aromatics, and half-order reaction with respect to hydrogen.

At any given xylene conversion, the benzene-toluene-xylene distribution relationships have been shown to be dependent only on charge stock composition and to be essentially independent of the exact combination of operating conditions. The differences between toluene demethylation and $C_8$ aromatic isomers demethylation are a variation in hydrogen consumption and in the adiabatic temperature rise, each of which increases with an increase in the number of methyl groups. Because of higher rates of demethylation of xylenes as compared to toluene, conversion in the order of 90 percent or higher is readily achieved. Generally, benzene is the desired product and, consequently, the total feed to the process is a mixture of toluene and xylenes, with xylenes being the fresh feed charge and toluene being recycled after separation from the reactor effluent. A combined fresh feed of xylenes and toluenes may be introduced into the process, with unconverted xylenes and toluene being recycled to extinction.

For a charge stock of $C_9$ to $C_{11}$ aromatic hydrocarbons, the operating conditions are substantially the same and the process can be adjusted to yield maximization, or optimization of mixed xylenes, rather than benzene. Such a charge stock could be a total stream or mixed, unseparated $C_9$ to $C_{11}$ alkyl-substituted aromatic homologs and isomers having a boiling range of about 320° to about 435° F. Such a charge stock is commercially available in extracts prepared from catalytic reformates, catalytic cycle oil, steam cracking by-products and coal tars.

The rates of reaction for polysubstituted $C_9$ aromatics are faster than that for xylenes, and, accordingly, appreciable quantities of xylenes are produced before they are demethylated to toluene. The order of the reactions involved is similar to those of xylenes. It has been determined that for any given charge stock (assuming constant activation energy for all rate constants), the distribution of the intermediate alkylaromatics and benzene may be readily determined for any conversion level, with the distribution being independent of the particular combination of operating conditions to attain these levels.

Hydrogenolysis involves the cleavage of an organic molecule by reaction with hydrogen. Thus, the hydrogenolysis of diphenyl involves the cleavage of an aromatic-aromatic C—C bond by its reaction with hydrogen. By effecting the hydrogenolysis of diphenyl compounds in accordance with my invention, the hydrogenation of diphenyl compounds is minimized, thus reducing the consumption of hydrogen and diphenyl compounds in undesired side reactions. Single pass conversions of diphenyl compounds to benzene of from 87.1 to 90.5 percent may be achieved, thus resulting in overall yields of over 98 to 99+ mol percent benzene based on fresh toluene feed when effecting dealkylation of the alkyl aromatic hydrocarbons and hydrogenolysis of diphenyl compounds in separate reaction zones.

The final reaction temperatures are achieved in a long reaction coil of the reaction heater. Such a coil is usually formed from high alloy austenitic steel having nickel as a stabilizer. Nickel acts as a catalyst to initiate and accelerate the decomposition of the reactants to carbon or coke which may result in the plugging of the coil, thereby necessitating shut-down and/or coil burnouts which shorten on-stream time. By the addition of a sulfur additive to the feed in an amount of from 100 to 300 p.p.m. as sulfur, nickel sulfide is formed at the active catalyst sites which poisons the activity of the surface of the inner coil wall to eliminate the catalytic effect of nickel. Other elements such as vanadium, chromium, etc., which have been added to form metal alloys which can withstand such high temperatures, also act in a manner similar to nickel, and can be accordingly deactivated by the use of such sulfur additives. Long carbon-free runs can be attained at high temperatures by the alternate addition of sulfur compounds, thereby permitting high conversions of feedstock with good selectivity to the desired product. Sulfur additives may be introduced into a separate or combined reactant stream in gaseous, liquid or solid forms, and may include $H_2S_{(g)}$, $CS_{2(g)}$, liquid mercaptans, or solid sulfur.

The use of a sulfur containing compound to eliminate or minimize coke formation may be obviated by the use of non-catalytic internally aluminized stainless steel coils which are commercially available.

A preferred method for carrying out the present invention will be had by reference to the following description when taken with the accompanying drawing which is a schematic flow diagram for the thermal hydrodealkylation of alkyl aromatic hydrocarbons.

An alkyl aromatic feed in line 10 may be admixed with recycle stream of unconverted alkyl aromatic hydrocarbons in line 11 and form in line 12 the total alkyl aromatic hydrocarbon feed to the process. A gaseous stream containing hydrogen and methane in line 13 and having of from 50 to 95 mol percent hydrogen may be admixed with a recycle gaseous stream in line 14 obtained from a separation zone, as hereinafter described, to form a hydrogen-containing gaseous stream in line 15. The gaseous stream in line 15 contains of from 50 to 95 mol percent hydrogen. A portion of the gaseous stream in line 15 is passed through line 16 and is admixed with the total alkyl aromatic feed in line 12, with the combined stream in line 17 being passed to a heater, generally indicated as 18.

The heater 18, includes convection and radiant heat sections, generally indicated as 19 and 20, respectively. The combined stream in line 17 is passed through a coil 21 of the convection section 19 wherein the stream is heated to a temperature from 500° to 800° F. The preheated combined stream is withdrawn from coil 21 and is passed through line 22 to a coil 23 of the radiant heat section 20 where the combined stream is heated to about the autogenous or incipient hydrodealkylation temperature, generally of from 1000° to 1100° F.

The remaining portion of the gaseous stream in line 15 is passed through line 24 to coils 25 and 26 of the convection section 19 of the heater 18 wherein the gaseous stream is preheated to a temperature of from 800° to about 1000° F. The preheated gaseous stream is withdrawn through line 27 and passed to a coil 28 in the radiant heat section 20 of the heater 18 and heated to a temperature of from 1300° to about 1700° F., preferably 1500° F.

The preheated combined feed is withdrawn from coil 23 through line 29, and is admixed in line 30 with a portion of the gaseous stream withdrawn from coil 28 through line 31 thereby substantially instantaneously raising the combined stream to a temperature intermediate the autogennous temperature and the final reaction temperature, generally of from 1150° to 1300° F. The actual temperature of the admixed reactant feed is dependent on the alkyl aromatic hydrocarbon feed being treated, as well as the quantity and temperatures of the respective gaseous streams.

The admixed feed in line 30 is thereafter passed through reaction coils 32a and 32b. Coil 32a is located in the radiant heat section of the heater 18 and external heating may be applied as in the case of pure toluene feed. Coil 32b is located outside of the heater 18 and is provided with an intermediate cold hydrogen-containing gas quench line connection 33. Depending upon the feedstock, the quench may be needed. At the outlet of coil 32b, a final reaction temperature of from 1300° to 1700° F., preferably 1500° F., is attained at total residence times of from 1 to 10 seconds, preferably 1 to 6 seconds. It is understood that coil 32b may be positioned within a refractory setting. The gas quench line connection 33 primarily functions to control the temperature of the reaction mixture to below about 1700° F.

The effluent from the coil 32b is passed to waste heat boiler 34 and cooled to a temperature of from 500° to 800° F. prior to passage through line 35 to a recovery unit generally indicated as 36. In the recovery unit 36, the effluent is treated to separate the desired product withdrawn through line 37 from the other components, including unconverted alkyl aromatic hydrocarbons which are recycled to the process of my invention through line 11, a gaseous stream containing hydrogen and methane which is recycled to the process in line 38, and a stream in line 39 containing diphenyl compounds. A portion of the gaseous stream in line 38 is passed through line 14 to provide a portion of the hydrogen requirements for the hydrodealkylation of the alkyl aromatic hydrocarbons.

The remaining portion of the gaseous stream in line 38 is passed through line 40 and is admixed with the diphenyl compounds in line 39 to form a combined stream in line 41. The combined stream in line 41 is passed through a coil 42 in the convection section 19 of the heater 18 wherein the stream is heated to a temperature of from 800° to 1000° F. The preheated stream is withdrawn from coil 42 through line 43 and is admixed with a portion of the gaseous stream withdrawn from coil 28 through line 44, thereby substantially instantaneously raising the stream to a temperature not less than 1000° F., a temperature at which the rate of hydrogenolysis of diphenyl hydrocarbons becomes appreciable. Generally the mixed stream should have a temperature of from 1100° to 1400° F., preferably 1200° to 1300° F. in order to increase the rate of hydrogenolysis. The mixed stream is passed through coil 45 in the radiant heat section 20 of the heater 18 wherein a final reaction temperature of from 1300° to 1700° F., preferably 1500° F., is attained at residence times of from 1 to 6 seconds, preferably 2 to 3 seconds.

The effluent from the coil 45 is withdrawn through line 46 and passed to a waste heat boiler 47 wherein the effluent is cooled to a temperature of from 500° to 800° F. prior to passage through line 48 to a recovery unit 36. Alternately, the effluent in line 46 may be combined (not shown) with the effluent in line 33 prior to passage through a cooling means. Fluorene, and any anthracene or phenanthrene separated from the effluent stream in the recovery unit 36, may be utilized as a partial source of fuel to the plant.

Thus, an overall yield of benzene from toluene of from 98 to 99+ mol percent may be achieved by the combined blocked-out operations of demethylation and hydrogenolysis. The individual processes are complementary, in that either inadvertent or planned increased yields of the diphenyl hydrocarbons through reduced toluene to benzene selectivities may be simultaneously compensated for by the separate reconversion of the recovered diphenyl excess to produce benzene, thus insuring a stabilized high overall ultimate yield of benzene. It will be appreciated that provision may be made in the combination dealkylation pyrolysis unit to accept extraneous diphenyl hydrocarbons produced in other plant units or purchased elsewhere when in surplus or in poor market demand. Also, provision may be made in the original heater design to operate the diphenyl pyrolysis reaction only intermittently and at higher than dealkylation unit by-product yield capacity by charging diphenyl feedstock previously accumulated in plant storage which would permit a highly desirable flexibility of plant operation.

A further understanding of my invention may be had by reference to the following example which is not intended in any way to limit the scope of the invention.

EXAMPLE

One mol per hour of toluene in line 10 is admixed with one mol per hour of a gaseous mixture in line 16 containing 65 volume percent hydrogen and 35 volume percent methane. The combined stream in line 17 is heated in coils 21 and 23 to a temperature of 1070° F. at a pressure of 500 p.s.i.g. Three mols per hour of a gaseous stream in line 24 is heated in coils 25, 26 and 28 to a temperature of 1500° F. at a pressure of 500 p.s.i.g. The streams are admixed in line 30 with the entire mixture reaching substantially instantaneously a temperature of 1200° F., whereby the thermal hydrodealkylation reaction of toluene is initiated. The admixture is then passed through coils 32a and 32b and heated to a final temperature of 1500° F. for a total residence time of 2 to 3 seconds. The effluent from the heater in line 33 had the analysis (excluding hydrogen and methane in hydrogen streams) as set forth below in Table I based on the toluene feed to the unit. An 89.9 percent conversion of toluene was obtained.

Table I

| Components: | Wt. percent |
|---|---|
| Methane | 15.4 |
| Toluene | 10.1 |
| Benzene | 68.1 |
| Diphenyl | 5.9 |
| Higher diphenyl | 1.1 |
| Fluorene | 1.2 |
| Total | [1] 101.8 |

[1] Based on toluene feed.

Three hundredths (0.03) mol per hour of diphenyl hydrocarbons are passed through line 39 and combined with five hundredths (0.05) mol per hour of a gaseous mixture in line 40 containing 65 volume percent hydrogen and 35 volume percent methane. The mixed stream in line 41 is heated in coil 42 to a temperature of 1121° F. at a pressure of 500 p.s.i.g. and passed to line 43. Twenty-six hundredths (0.26) mol per hour of a gaseous stream in line 44 are admixed with the preheated steam in line 43, whereby the mixture reaches substantially instantaneously a temperature of 1286° F. The mixture is passed through coil 45 and heated to a final reaction temperature of 1501° F. at a residence time of 3.3 seconds. The effluent from coil 45 had the analysis (excluding hydrogen and methane in hydrogen streams) as set forth in Table 2 below.

Table 2

| Components: | Wt. percent |
|---|---|
| Benzene | 90.5 |
| Toluene | 1.2 |
| Diphenyl | 9.5 |
| Total | 101.2 |

While the invention has been described with particular reference to alkyl benzene, it is understood that other alkyl aromatic hydrocarbons, such as alkyl substituted naphthalenes may be dealkylated in accordance with the process of my invention, however, as a practical matter, alkyl aromatic compounds which would form tars upon dealkylation are not contemplated as a feed to the process.

As hereinbefore mentioned, a feed stock which contains paraffinic hydrocarbons will result in a higher first reaction temperature (as compared with a feed stock having no paraffinic hydrocarbons), since such paraffinic hydrocarbons liberate heat when hydrogenated to methane. Similarly, a higher final reaction temperature for a specific feed (whether alkyl aromatic hydrocarbons or diphenyl compounds) will be obtained when the hydrogen containing gaseous stream includes hydrocarbons, such as ethane, propane, butane, etc., since the hydrogenation of such hydrocarbons is also an exothermic reaction.

While I have shown and described a preferred form of my invention, I am aware that variations may be made thereto and I, therefore, desire a broad interpretation of my invention within the scope of the disclosure herein and the following claims.

I claim:

1. A method for effecting the hydrogenolysis of a stream primarily comprised of a diphenyl hydrocarbon comprising:
   (a) mixing said stream with a hydrogen containing gaseous stream, said streams being mixed in a quantity and at a temperature and rate such that the combined stream is substantially instantaneously brought to a temperature of not less than 100° F.;
   (b) heating said mixture to a final reaction temperature of between about 1300° and about 1700° F., the residence time of the hydrogenolysis reaction being between about one and about 10 seconds; and
   (c) recovering an effluent stream containing a mononuclear aromatic hydrocarbon.

2. The method as defined in claim 1 wherein at least a portion of the heating of step (b) is external heating whereby the reaction is non-adiabatic.

3. The method as defined in claim 1 wherein the mixing of step (a) raises the temperature to between about 1100° F. and about 1400° F.

4. The method as defined in claim 3 wherein the residence time is between about one and about six seconds.

5. The method as defined in claim 4 wherein the hydrogen containing gaseous stream contains at least 50 volume percent hydrogen and the ratio of the hydrogen containing stream to the diphenyl hydrocarbon feed stream is from about 5:1 to about 15:1.

6. The method as defined in claim 5 wherein the hydrogen containing gaseous stream is at a temperature between about 1300° F. and about 1700° F.

7. The method as defined in claim 6 wherein the diphenyl hydrocarbon feed stream is at a temperature between about 800° F. and about 1000° F.

8. A method for effecting the hydrogenolysis of a stream primarily comprised of a diphenyl hydrocarbon comprising:
(a) mixing said stream with a first hydrogen containing gaseous stream;
(b) preheating the mixture of step (a) to a temperature of between about 800° F. and about 1000° F.;
(c) mixing the combined stream of step (b) with a second hydrogen containing gaseous stream, said streams being mixed in a quantity and at a temperature and rate such that the combined stream is substantially instantaneously brought to a temperature of not less than 1000° F.;
(d) heating said mixture to a final reaction temperature of between about 1300° and about 1700° F., the residence time of the hydrogenolysis reaction being between about one and about 10 seconds; and
(e) recovering an effluent stream containing benzene.

9. The method as defined in claim 8 wherein at least a portion of the heating of step (d) is external heating whereby the reaction is non-adiabatic.

10. The method as defined in claim 8 wherein the first hydrogen containing gaseous stream contains at least 50 volume percent hydrogen, and the ratio of such a stream to the diphenyl hydrocarbon containing stream is from 1:1 to 2:1 and wherein the second hydrogen containing gaseous stream contains at least 50 volume percent hydrogen, the ratio of the second hydrogen containing gaseous stream to the mixture of step (b) being between about 5:1 and about 15:1.

11. The method as defined in claim 10 wherein the mixture of step (c) is raised to a temperature between about 1100° F. and about 1400° F.

12. The method as defined in claim 11 wherein the residence time is between about one and about six seconds.

13. A continuous process for producing valuable hydrocarbon from an alkyl aromatic hydrocarbon feed which comprises:
(a) mixing said alkyl aromatic hydrocarbon feed with a hydrogen-containing gaseous stream, the quantity, temperature and rate of injection of said gaseous stream being selected to raise substantially instantaneously said alkyl aromatic hydrocarbon to a temperature intermediate the autogenous and final reaction temperature;
(b) effecting the hydrodealkylation of said alkyl aromatic hydrocarbon in a dealkylation zone;
(c) treating the reaction mixture of step (b) to separate a stream primarily comprised of diphenyl hydrocarbons and a stream of valuable hydrocarbon therefrom;
(d) mixing said stream primarily comprised of diphenyl hydrocarbons with a hydrogen containing gaseous stream, said streams being mixed in a quantity and at a temperature and rate such that the combined stream is substantially instantaneously brought to a temperature of not less than 1000° F.;
(e) heating said mixture to a final reaction temperature of between about 1300° and about 1700° F. in a hydrogenolysis zone separate from the dealkylation zone, the residence time of the reaction being between about one and about 10 seconds; and
(f) recovering an effluent stream containing benzene.

14. The method as defined in claim 13 wherein the mixing of step (d) raises the temperature to between about 1100° F. and about 1400° F.

15. A method for producing valuable hydrocarbons from an alkyl aromatic hydrocarbon feed which comprises:
(a) mixing said alkyl aromatic hydrocarbon feed with a hydrogen-containing gaseous stream;
(b) heating the mixture of step (a) to about the autogenous reaction temperature of hydrodealkylation;
(c) heating a second hydrogen-containing stream;
(d) admixing the mixture of step (b) with the second hydrogen-containing stream of step (c), the quantity, temperature and rate of injection of said second hydrogen-containing stream being selected to raise substantially instantaneously said alkyl aromatic hydrocarbon feed to a temperature intermediate the autogenous and final reaction temperature;
(e) effecting the hydrodealkylation of said alkyl aromatic hydrocarbon feed in a dealkylation zone;
(f) separating a stream primarily comprised of diphenyl hydrocarbons and a stream containing valuable hydrocarbons from the reaction mixture of step (e);
(g) mixing said stream primarily comprised of diphenyl hydrocarbons with a hydrogen containing gaseous stream, said stream being mixed in a quantity and at a temperature and rate such that the combined stream is substantially instantaneously brought to a temperature of not less than 1000° F.;
(h) heating said mixture to a final reaction temperature of between about 1300° and about 1700° F., in a hydrogenolysis zone separate from the dealkylation zone, the residence time of the reaction being between about one and about 10 seconds; and
(i) recovering an effluent stream containing benzene.

16. A method for producing valuable hydrocarbons from an alkyl aromatic hydrocarbon feed which comprises:
(a) mixing said alkyl aromatic hydrocarbon feed with a hydrogen-containing gaseous stream;
(b) heating the mixture of step (a) to about the autogenous reaction temperature of hydrodealkylation;
(c) effecting the hydrodealkylation of said alkyl aromatic hydrocarbon feed in a dealkylation zone;
(d) separating a stream primarily comprised of diphenyl hydrocarbons and a stream containing valuable hydrocarbons from the reaction mixture of step (c);
(e) mixing said diphenyl hydrocarbon with a hydrogen-containing gaseous stream;
(f) preheating the mixture of step (e);
(g) mixing the mixture of step (f) with a hydrogen-containing gaseous stream, said streams being mixed in a quantity and at a temperature and rate such that the combined stream is substantially instantaneously brought to a temperature of not less than 1000° F.;
(h) heating said mixture to a final reaction temperature of between about 1300° and about 1700° F., in a hydrogenolysis zone separate from the dealkylation zone, the residence time of the reaction being between about one and about 10 seconds; and
(i) recovering an effluent stream containing benzene.

17. The method as defined in claim 16 wherein the mixing of step (g) raises the temperature to between about 1100° F. and about 1400° F.

18. The method as defined in claim 17 wherein the alkyl aromatic hydrocarbon feed includes a mixture of xylenes.

19. The method as defined in claim 17 wherein the alkyl aromatic hydrocarbon feed includes $C_9$ to $C_{11}$ aromatic hydrocarbons.

20. The method as defined in claim 17 wherein the alkyl aromatic hydrocarbon feed is a mixture of xylenes and benzene is the product.

21. The method as defined in claim 17 wherein the alkyl aromatic hydrocarbon feed is a mixture of xylenes and toluene, and benzene is the product.

References Cited

UNITED STATES PATENTS

| | | | |
|---|---|---|---|
| 1,717,354 | 6/1929 | Burwell | 23—212 |
| 2,344,258 | 3/1944 | Miles | 260—667 |
| 3,149,176 | 9/1964 | Glazier et al. | 260—672 |
| 3,160,671 | 12/1964 | Feigelman et al. | 260—672 |
| 3,171,862 | 3/1965 | Larkins et al. | 260—672 |
| 3,193,592 | 7/1965 | Eubank | 260—672 |
| 3,198,846 | 8/1965 | Kelso | 260—672 |
| 3,201,488 | 8/1965 | Sherk et al. | 260—672 |
| 3,213,151 | 10/1965 | Sherk | 260—672 |
| 3,225,111 | 12/1965 | Lehrian et al. | 260—672 |
| 3,247,263 | 4/1966 | Weidenhammer | 260—621 |

DELBERT E. GANTZ, *Primary Examiner.*

G. E. SCHMITKONS, *Assistant Examiner.*